United States Patent [19]

Bernhard

[11] Patent Number: 4,567,112

[45] Date of Patent: Jan. 28, 1986

[54] FLEXIBLE FOIL MATERIAL OR LAMINATE, PARTICULARLY FOR SOFT PACKAGING AND CAPPING

[75] Inventor: Marcel Bernhard, Selestat, France

[73] Assignee: Societe Alsacienne d'Aluminium, Saint Julien en Genevoix, France

[21] Appl. No.: 597,034

[22] Filed: Apr. 5, 1984

[30] Foreign Application Priority Data

Dec. 26, 1983 [FR] France .................................. 83 20758

[51] Int. Cl.$^4$ .......................... B32B 15/08; B32B 27/32
[52] U.S. Cl. ..................................... 428/461; 428/523
[58] Field of Search ................ 428/461, 457, 523, 500

[56] References Cited

U.S. PATENT DOCUMENTS

| 4,424,254 | 1/1984 | Hedrick et al. | 428/461 X |
| 4,449,014 | 5/1984 | Brezinsky | 428/461 X |
| 4,451,526 | 5/1984 | Claude et al. | 428/461 X |

*Primary Examiner*—Thomas J. Herbert
*Attorney, Agent, or Firm*—Ronald G. Goebel

[57] ABSTRACT

The flexible foil material or laminate of the invention comprises a synthetic material layer disposed between two thin aluminum foils and is characterized in that the synthetic material is amorphous polypropylene or a composition containing amorphous polypropylene.

Preferably, the composition comprises amorphous polypropylene, a soft microcrystalline wax and/or terpolymer:ethylene-acrylic acid-acrylic acid ester.

The material of the invention is perfectly suitable for manufacturing wine bottle caps as well as wrappers for food products such as cheese.

5 Claims, No Drawings

FLEXIBLE FOIL MATERIAL OR LAMINATE, PARTICULARLY FOR SOFT PACKAGING AND CAPPING

The present invention concerns a flexible foil material or laminate, particularly for soft packaging and capping, comprising a layer of synthetic material disposed between two thin aluminum foils.

Materials of this type are at present used for manufacturing caps for champagne or sparkling wine bottles, as well as for ordinary wine bottles, and for wrapping food products such as cheeses, etc. . . .

These materials however do not give entire satisfaction, particularly for the manufacturing of wine caps. In fact, their intermediate layer, formed generally by polyethylene, has a certain elasticity so that after they have been folded over the bottles or over the products to be packed, the folds formed have a tendency to open. This affects the aesthetic appearance of the product and further risks reducing the storage life of the wrapped goods. On the other hand, the forms or embossing which are made for an easy handling of the caps or improving the appearance, have a tendency to disappear over time. Furthermore, when these materials are provided with a tearing strip or thread, they do not tear cleanly of evenly and require considerable force.

The present invention proposes overcoming these disadvantages and, for this purpose, provides a flexible foil material or laminate of the above mentioned type in which the synthetic material forming the intermediate layer is amorphous polypropylene or a composition containing amorphous polypropylene.

The material of the invention is an inert laminate whose appearance and feel approximate the expensive tin-lead alloy which is at present used for wine caps. It further presents a remarkable malleability, which facilitates its shaping and allows it to remain tightly folded or formed against the bottle neck or product on which it has been folded or bent. Furthermore, the adhesive power of its intermediate layer with respect to the thin aluminum foils is much greater than that of polyethylene, giving it excellent strength. In addition, when it is desired to remove it, its tear is clean and even and hence aesthetic. Last, it has an even appearance because unlike the material containing polyethylene, it does not contain any bubbles.

Preferably, the composition forming the synthetic material of the laminate of the invention comprises amorphous polypropylene, a soft microcrystalline wax and/or a terpolymer:ethylene-acrylic acid-acrylic acid ester.

Tests carried out in the laboratory have shown that it was desirable for the microcrystalline wax used to have a melting point between 72° and 80° C. and its percentage in the composition should be between 0 and 80% by weight.

They also showed that it is preferable for the ester to be a $C_1$-$C_5$ alkyl ester of acrylic acid and that the terpolymer content in the composition should be between 0 and 25% by weight.

The composition forming the intermediate layer of the laminate of the invention has a softening point between 80° and 150° C. and a viscosity between 8 and 60 pascals per second at 190° C. These characteristics may however be modified by putting in the composition fillers such as talc, kaolin, limestone, silica, titanium dioxide, etc. . . .

For the sake of completeness, the thin aluminum foils (formed in fact from aluminum or aluminum alloys) may have a thickness of at least 7 microns and the intermediate layer may have a basic weight between 20 and 40 g/m2.

It will finally be noted that this intermediate layer may be deposited in a conventional way in the molten state, for example by coating with rollers, by sandwich extrusion using conventional, flat or extrusion dies, etc. . . .

I claim:

1. A flexible foil material or laminate useful for soft packaging and capping comprising a layer of synthetic material disposed between two thin aluminum foils, said synthetic material comprising amorphous polypropylene or a composition containing amorphous polypropylene wherein said composition further contains a material selected from the group consisting of a soft microcrystalline wax, a terpolymer of ethylene, acrylic acid and acrylic acid ester and mixtures thereof wherein said layer has a basic weight of between 20 and 40 g/m2.

2. The flexible material or laminate according to claim 1, characterized in that the soft microcrystalline wax has a melting point between 72° and 80° C.

3. The flexible material or laminate according to claim 1, characterized in that the percentage of soft microcrystalline wax in the composition is between 0 and 80% by weight.

4. The flexible material or laminate according to claim 1, characterized in that the acrylic acid ester is a $C_1$-$C_5$ alkyl ester of acrylic acid.

5. The flexible material or laminate according to claim 1 or 4, characterized in that the percentage of terpolymer in the composition is between 0 and 25% by weight.

* * * * *